US006615088B1

(12) United States Patent
Myer et al.

(10) Patent No.: US 6,615,088 B1
(45) Date of Patent: Sep. 2, 2003

(54) SYSTEM AND METHOD OF DEVICE INTERFACE CONFIGURATION FOR A CONTROL SYSTEM

(75) Inventors: Aaron L. Myer, Draper, UT (US); Daren E. Orth, Farmington, UT (US)

(73) Assignee: AMX Corporation, Richardson, TX (US)

( * ) Notice: Subject to any disclaimer, the term of this patent is extended or adjusted under 35 U.S.C. 154(b) by 0 days.

(21) Appl. No.: 09/328,920

(22) Filed: Jun. 9, 1999

(51) Int. Cl.[7] ............................................. G05B 15/02
(52) U.S. Cl. ............................. 700/20; 700/3; 700/17; 700/83; 709/220; 717/176
(58) Field of Search ............................. 700/3, 17, 83, 700/2, 20; 709/220; 707/501.1, 513; 717/174–178

(56) References Cited

U.S. PATENT DOCUMENTS

| | | | | | |
|---|---|---|---|---|---|
| 5,086,385 A | * | 2/1992 | Launey et al. | ................ | 700/83 |
| 5,428,470 A | | 6/1995 | Labriola, II | ................. | 359/119 |
| 5,764,155 A | * | 6/1998 | Kertesz et al. | ......... | 340/825.08 |
| 5,982,445 A | * | 11/1999 | Eyer et al. | ................... | 348/461 |
| 6,078,747 A | * | 6/2000 | Jewitt | .......................... | 395/712 |
| 6,121,593 A | * | 9/2000 | Mansbery et al. | .......... | 219/679 |
| 6,161,133 A | * | 12/2000 | Kikinis | ....................... | 709/220 |
| 6,195,688 B1 | * | 2/2001 | Caldwell et al. | ............ | 709/208 |

FOREIGN PATENT DOCUMENTS

| | | | |
|---|---|---|---|
| EP | 0 530 973 A1 | 3/1993 | |
| JP | 10-276478 | * 10/1998 | ............ H04Q/9/00 |
| WO | WO 98/36335 | 8/1998 | |
| WO | WO 98/36336 | 8/1998 | |

* cited by examiner

Primary Examiner—Paul P. Gordon
(74) Attorney, Agent, or Firm—Gardere Wynne Sewell LLP (57) ABSTRACT

A control system comprises a master controller and at least one device coupled to the master controller via a network. At least one generic device interface module resides on the master controller, where the device interface module defines a basic protocol for interface with any device. Configuration information associated with the at least one device is used to tailor the at least one generic device interface module to communicate and operate with the at least one device.

35 Claims, 6 Drawing Sheets

FIG. 7C

SYSTEM AND METHOD OF DEVICE INTERFACE CONFIGURATION FOR A CONTROL SYSTEM

TECHNICAL FIELD OF THE INVENTION

This invention is related in general to the field of control system. More particularly, the invention is related to system and method of device driver configuration for a control system.

BACKGROUND OF THE INVENTION

In a fully automated environment, appliances that change the various parameters of the environment can be linked to a control area network (CAN) and a computer-based controller. The appliances may include heating, ventilation and air conditioning (HVAC) systems, lighting systems, audio-visual systems, telecommunications systems, security systems, surveillance systems, and fire protection systems, for example. One or more easy-to-use user interface, such as a touch panel, may be electronically linked to the control area network to accept user input and display current system status. AMX Corporation of Dallas, Texas designs and manufactures such networked appliance control systems.

SUMMARY OF THE INVENTION

Accordingly, there is a need for a system and method of device interface configuration For a control system.

In accordance with the present invention, a system and method of device interface configuration For a control system are provided which eliminate or substantially reduce the disadvantages associated with prior control systems.

In one aspect of the invention, a control system comprises a master controller and at least one device coupled to the master controller via a network. At least one generic device interface module resides on the master controller, where the device interface module defines a basic protocol for interface with any device. Configuration information associated with the at least one device is used to tailor the at least one generic device interface module to communicate and operate with the at least one device.

In another aspect of the invention, a method of communicating with a device in a control area network includes the steps of automatically obtaining configuration information associated with the device, where the configuration file includes communication and operating protocol of the device. A specific instance of a generic device interface object is then generated using the configuration information associated with the device, and communication with the device is then performed with the specific object instance.

In yet another aspect of the invention, a control area network includes a master controller, and at least one device coupled to the master controller via a local area network. At least one generic device interface object resides on the master controller, where the at least one device interface object defines a basic protocol for interface with any device. A configuration file associated with the at least one device is used to tailor the at least one generic device interface object to generate a specific interface object instance operable to communicate and operate with the at least one device.

BRIEF DESCRIPTION OF THE DRAWINGS

For a better understanding of the present invention, reference may be made to the accompanying drawings, in which.

DETAILED DESCRIPTION OF THE INVENTION

Figure 1:
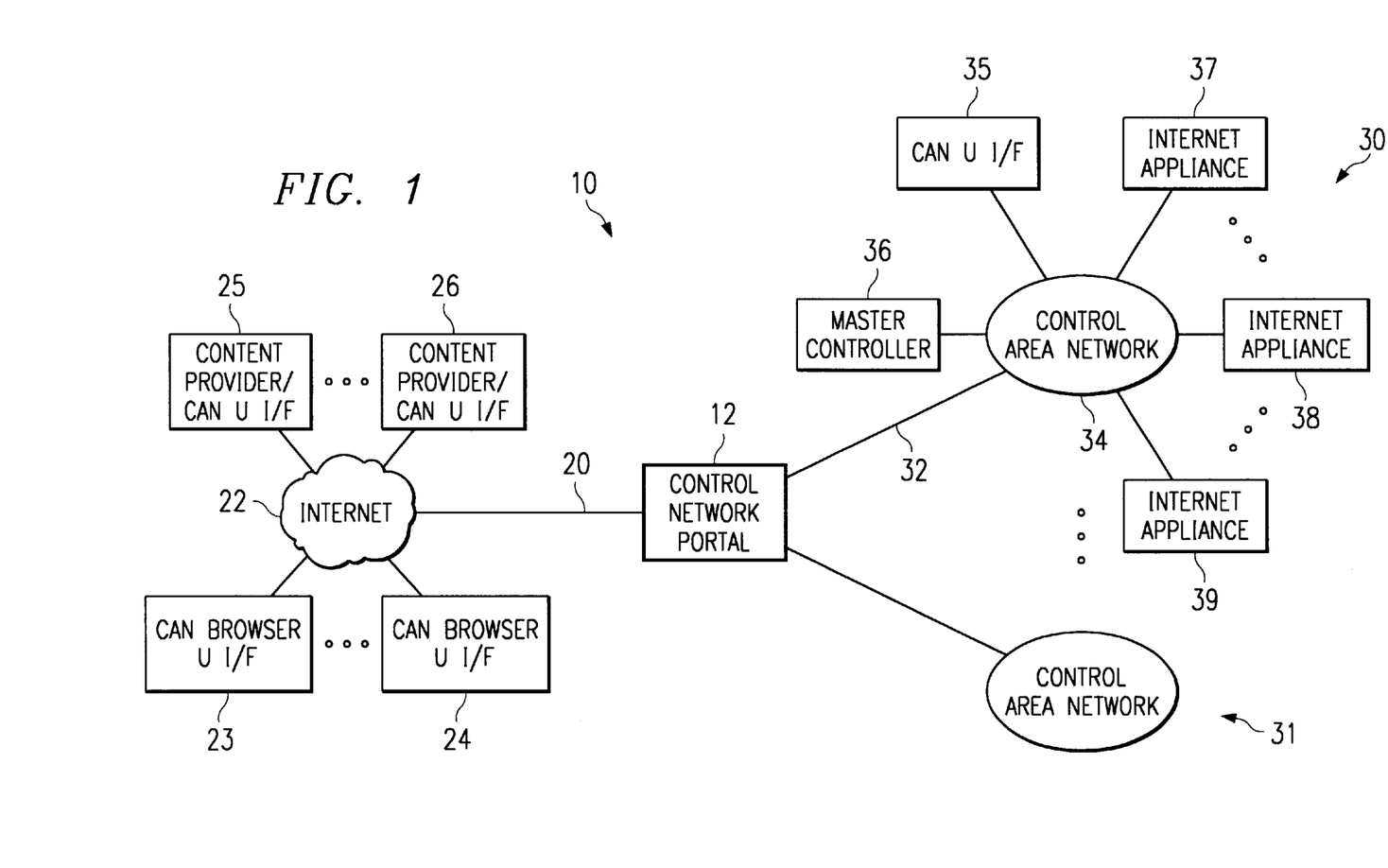
FIG. 1 is a simplified top-level block diagram of a system and method of coupling one or more control systems to the Internet constructed according to an embodiment of the present invention.

FIG. 1 is a simplified top-level block diagram of a system and method 10 of Internet control system which couple one or more control systems to the Internet constructed according to the teachings of the present invention. The implications of employing system and method 10 of the present invention are the ability to communicate with, control, and be controlled by one or more Internet nodes or Internet applications that act as one or more devices in a control system connected by a control area network (CAN). These Internet applications may include web browsers, web server applications of information content providers, and email applications. In other words, the geographical and communication protocol boundaries are transparent between a local control area network and the Internet, so that the Internet, web information content providers and web browser applications become devices in the control system. By definition, a device in the control system can send control commands to and/or receive control messages from a master controller on the control area network. Hereinafter, the word Internet may be also used to refer to an Intranet or the World Wide Web and vice versa.

System 10 includes a control network portal 12 coupled between the Internet 22 and one or more control area networks 30 and 31. Control area networks 30 and 31 are local area networks operating under transport protocols such as Ethernet, and AXLink and PHASTLink® of AMX Corporation (Dallas, Tex.) that interconnect a variety of devices, appliances and/or equipment. The underlying network connectivity 34 may be wired, wireless, power line carriers, or any suitable transmission medium. Coupled to control area networks 30 and 31 are a plurality of devices, appliances and/or equipment, including control area network user interfaces (CAN UI/F) 35, master controllers 36, and Internet appliances 37–39. Some devices may be coupled to control area networks 30 and 31 via additional intermediate communications devices, such as an RS 232 controller (not shown).

Control area network user interface device 35 is any device that is capable of receiving user input and displaying or indicating control network status. For example, a touch panel, a computer terminal with a monitor, keyboard and pointing device, and any device with similar functionalities may serve as control area network user interface 35. As described in detail below, with the use of control area network portal 12 of the present invention, Internet applications are also capable of functioning as control area network user interface devices without the use of custom and dedicated applications on the user's end. Master controller 36 is generally a CPU-based controller that controls the communications among user interface 35 and Internet appliances 37–39. It is operable to receive user inputs received by user interface devices, such as commands, and instruct the appropriate Internet appliance to act according to the command. Master controller 36 may also poll each device in control area network 30 periodically to monitor its status. The system status and/or the status of each device may be sent to control area network user interface devices for display.

Internet appliances 37–39 are devices that can receive commands from master controller 36 and operate or act according to the command. Internet appliances 37–39 may include equipment that affect or monitor the various parameters of the premises. For example, Internet appliances 37–39 may include heating and air conditioning, lighting, video equipment, audio equipment, sprinklers, security cameras, infrared sensors, smoke detectors, etc. in a residential or commercial control area network. Household appliances, such as a hot tub, fireplace, microwave oven, coffee maker, etc. may also be Internet appliances coupled to the network. Internet appliances 37–39 may also be capable of providing a current status of its operational state to master controller 36, such as on/off, temperature settings, current ambient temperature, light intensity settings, volume settings, threshold settings, and predetermined alphanumeric strings reflective of operational states.

Master controller 36 is also operable to receive user input from nodes of the Internet 22 via control network portal 12. Connected to Internet 22 are content providers 25 and 26, which may also function as control area network user interface devices. Content providers 25 and 26 are typically web servers that generate and provide static and/or dynamic information and content in the form of web pages. Content provider applications executing on the web server are able to mine data stored in databases (not shown). The web pages are typically developed with hypertext markup language (HTML), and various other scripting languages and programming environments such as Microsoft Active Server Pages (ASP), Common Gateway Interface (CGI), Internet Server Application Programming Interface (ISAPI), JAVA, ActiveX, Cold Fusion, etc. that make the web pages more dynamic and interactive.

Also connected to the Internet 22 are web browsers 23 and 24 that may also serve as control area network user interfaces. Web browsers 23 and 24 are application programs that can be used to request web pages from content providers 25 and 25 and decode the web pages. Web browser applications include NETSCAPE NAVIGATOR and MICROSOFT INTERNET EXPLORER, for example. Typically, a user executes a web browser application on her personal computer and accesses the World Wide Web via a dial-up connection to an Internet service provider. The Internet or World Wide Web may also be accessed via other means such as cable modems and digital subscriber lines (DSL). The user makes a request for a particular web page or particular web site by entering or specifying a uniform resource locator (URL). The URL is associated with an Internet protocol (IP) address of the specified web site. Every computer connected to the World Wide Web and Internet has a unique IP address. This address is used to route message packets to specific computers and users. Internet protocol or IP is the message transport and communications protocol of the Internet and World Wide Web.

When the web browser requests a certain URL, a connection is first established with a web server of a content provider that is addressed by the URL. A hypertext transport protocol (HTTP) request is then issued to the web server to download an HTML file. The web server receives the request and sends a web page file to the web browser, which decodes the file to display information in specified format on the screen. Web pages with dynamic content provided by gateway interfaces such as CGI and ISAPI are executable applications that are ran by the web server upon user request. The executing gateway application is able to read parameter information associated with the request and generate an output in the form of an HTML file in response to the parameter values. Another way to add dynamic and interactive content to web pages uses ASP. ASP scripts are server-side executable scripts that are directly incorporated in the HTML web pages. Upon request for the page, the web server executes the ASP script in response to input parameter values and generates the web page with dynamic content.

Using control network portal 12, users may access control area networks 30 and 31 via web browsers 23 and 24 accessing web pages provided by control network portal 12 or value-added web pages provided by content providers 25 and 26. For example, a user who has a control area network deployed in her luxury residence to control various aspects of the home environment may use a web browser application to remotely monitor her home. She may change the temperature setting to decrease energy use, for example, because she will be leaving on a business trip straight from work. She may also use the surveillance cameras to visually ensure security has not been breached. She may even be able to remotely program her VCR to record certain favorite programs that will be broadcast while she is away. An example of value-added web pages provided by content providers is the provision of an interactive version of the television programming web page, www.tvguide.com. A user may request this web page, determine available program choices, and click on a certain program. Options may be provided to enable the user to turn on the television and tune to a particular channel scheduled to broadcast the selected program or to program the VCR to record the selected program.

Another example of value-added web pages provided by content providers is the provision of a secured web page that an electric company may access to slightly raise the temperature settings of the air conditioning systems of its participating customers in anticipation of high demand brown out conditions. Yet another example is a web page that a security company may use to access, monitor and control the security, surveillance and fire protection systems of its customers.

Figure 2:
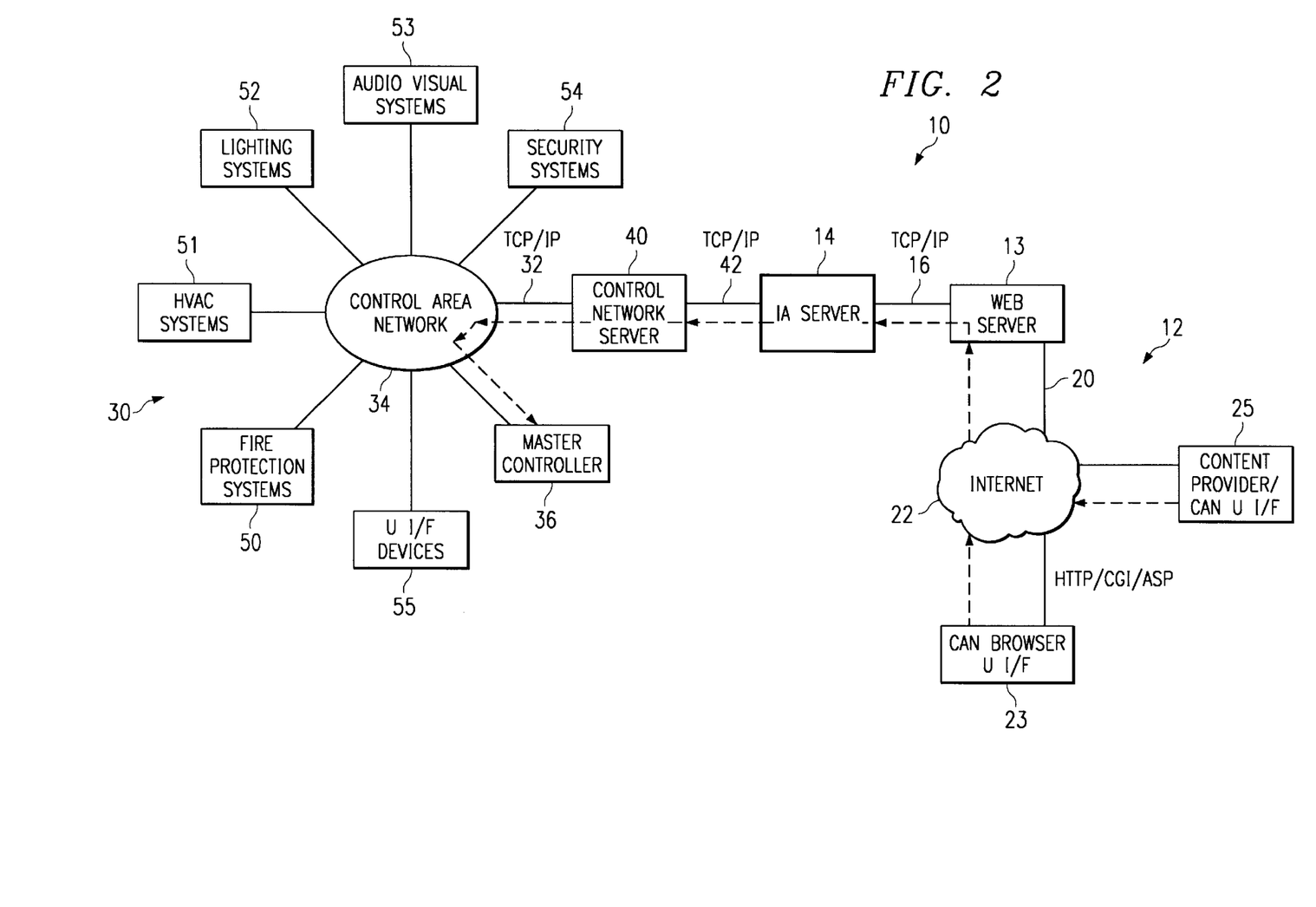
FIG. 2 is a more detailed block diagram of a system and method of coupling one or more control systems to the Internet constructed according to an embodiment of the present invention.

FIG. 2 is a more detailed block diagram of a system and method 10 of coupling one or more control system to the Internet constructed according to an embodiment of the present invention. Control area network portal 12 may include a web server 13 coupled to the Internet 22. Web server 13 is also coupled to an Internet appliance (IA) server 14, which may also be coupled to a control network server 40. Control network server 40 is coupled to control area network 30 that links several appliances and systems, such as fire protection systems 50, heating, ventilation and air conditioning (HVAC) systems 51, lighting systems 52, audio and visual systems 53, and security systems 54. Control area network 30 is also coupled to user interface devices 55 and master controller 36.

It may be noted that control network portal 12 may be implemented by a single stand-alone system that has sufficient memory and processing power or several separate systems with-distinct functions as shown in FIG. 2. Web server 13 is operable to receive requests of web pages from web browser 23 and to respond by generating and providing the requested web pages. The information content of the web pages may be dynamically obtained by communicating with IA server 14, which is operable to communicate with master controller 36 via control network server 40 to obtain status and other information. Control network server 40 is used only if there is protocol conversion or other control issues needed to operate the control area network. It may be thought of, logically, that IA server 14 is directly coupled to the network and functions as a device on the network. Commands entered at a web browser are sent to web server 13, which relays the commands to master controller 36 via IA server 14 and control network server 40. Master controller 36 then instructs appropriate appliances and/or systems in the control network to act according to the received command.

Figure 3:
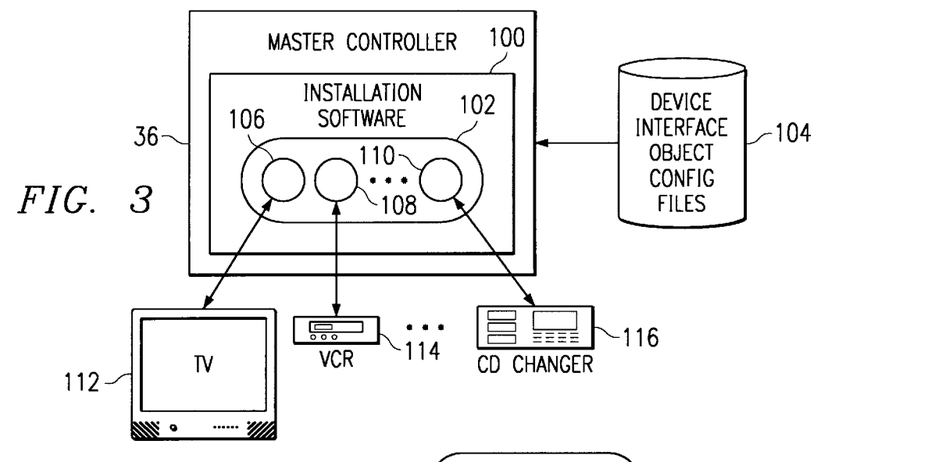
FIG. 3 is a more detailed block diagram of a master controller with a system and method of device interface configuration constructed according to an embodiment of the present invention.

FIG. 3 is a more detailed block diagram of a master controller 36 with a system and method of device interface configuration constructed according to an embodiment of the present invention. Master controller 36 includes an installation software 100 which may be used to install and configure the components in a control system. Installation software 100 defines a generic device interface object 102, which may be configured by device interface object configuration files 104 to instantiate objects 106–110 tailored to specific devices made by specific manufacturers, such as a television set 112, a VCR 114, and a CD changer 116, for example for a home entertainment application. Each device may also include its own embedded configuration file for upload to master controller 36 when the device is brought on-line. Each configuration file 104 includes device-specific protocol information related to a specific device. Instances 106–110 enable master controller 36 to tailor its installation software 100 for the installation of the specific devices and further allows master controller 36 to communicate with the specific devices.

Figure 5A:
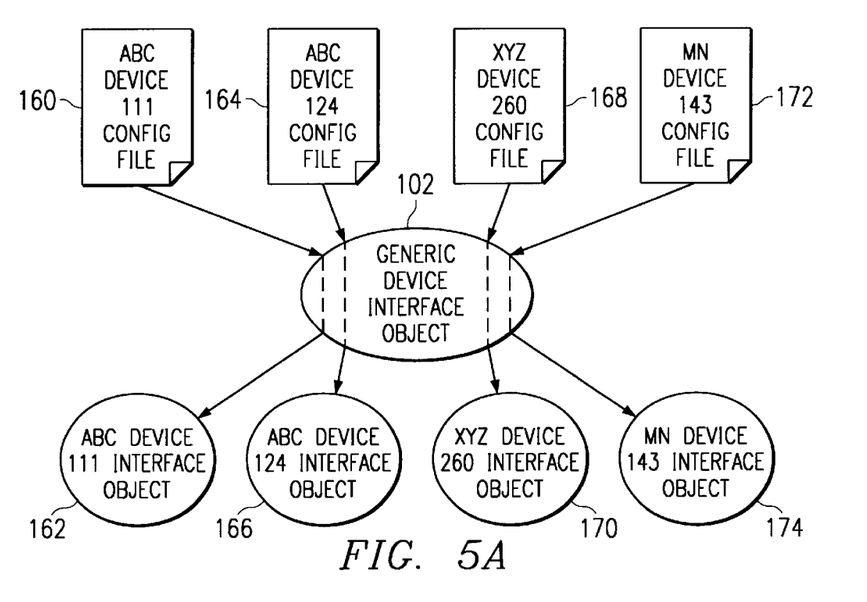
FIG. 5A is a block diagram of a process for configuring a device interface object according to an embodiment of the present invention.

This configuration technique is shown in more detail in FIG. 5A. Instances of generic device interface object 102 are generated by reading or loading configuration files which describe specific devices made by specific manufacturers. For example, loading a configuration file 160 of device number 111 made by company ABC causes an instance 162 of generic device interface object 102 that has knowledge of the specifics of that device to be generated. Similarly, the same generic device interface object 102, when characterized by a configuration file 164 for device number 124 made by company ABC, generates an ABC device 124 interface object instance 166. Configuration file 168 describing the characteristics of device number 260 manufactured by company XYZ causes an XYZ device 260 interface object to be instantiated from generic device interface object 102. Further, configuration file 172 describing the characteristics of device number 143 manufactured by company MN causes an MN device 143 interface object to be instantiated from generic device interface object 102. With the system and method of the present invention, device drivers for new devices may be generated in substantially shortened development time.

Figure 4:
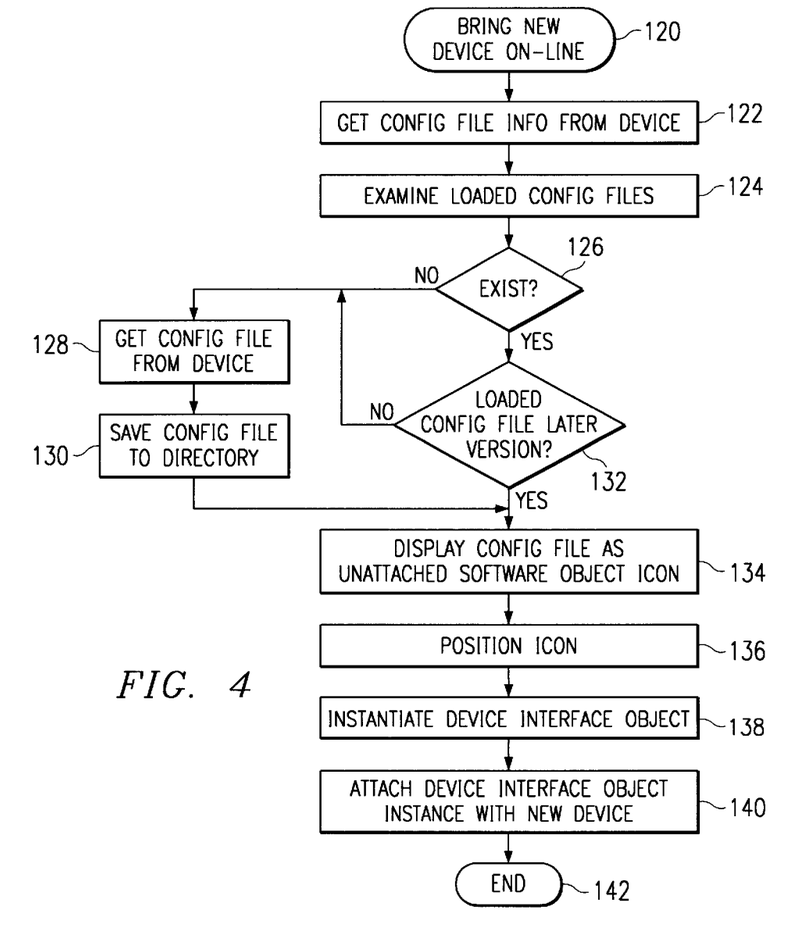
FIG. 4 is a flowchart of a process for bringing a new device on-line according to an embodiment of the present invention.

FIG. 4 is a flowchart of a process 120 for bringing a new device on-line according to an embodiment of the present invention. When a new device is first "plugged" into the control area network, it communicates with master controller 36 to announce its presence. The information the new device conveys to master controller 36 may include a manufacturer name and device type. With this information, master controller 36 may display an unattached hardware icon representing the new device. Master controller 36 queries the new device to get its configuration file information, as shown in block 122.

Master controller 36 then examines its loaded configuration files in block 124 to determine if a configuration file for the new device exists, as shown in block 126. If a configuration file for the new device does not exist, then a configuration file is obtained from the new device over the control network link, as shown in block 128. The configuration file is then saved into a directory, as shown in block 130. If the configuration for the new device does exist, then the configuration file is compared with the configuration file information obtained from the new device. The configuration file information may include a file name and a version number. If the pre-existing configuration file in master controller 36 does not have the same or a later version than the configuration file in the new device, then the newer version configuration file is obtained from the new device and saved, as shown in blocks 128 and 130. Operating in this manner, the newest available version of the configuration file is automatically loaded into master controller 36.

Figure 5B:
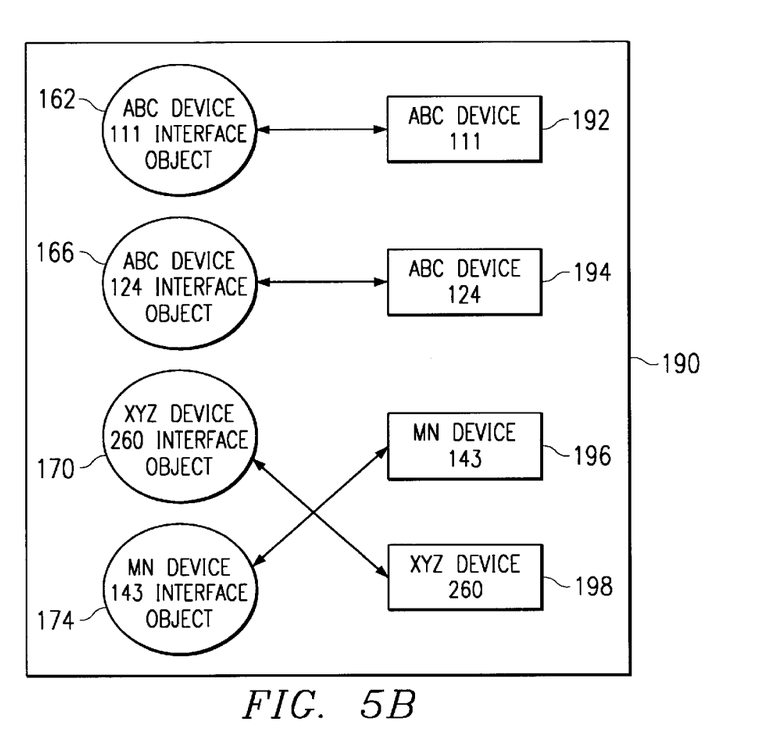
FIG. 5B is a block diagram of an exemplary screen for installing a new device according to an embodiment of the present invention.
Figure 6A:
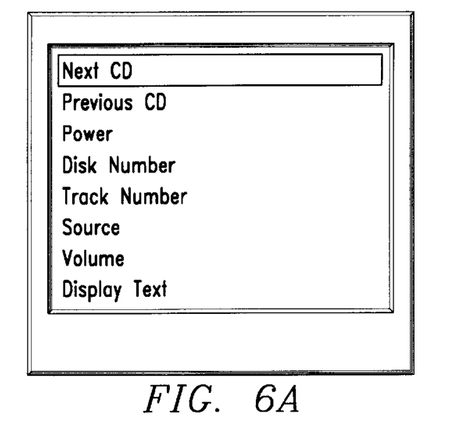
FIGS. 6A–6F are exemplary command windows for programming commands according an embodiment of the present invention.
Figure 6B:
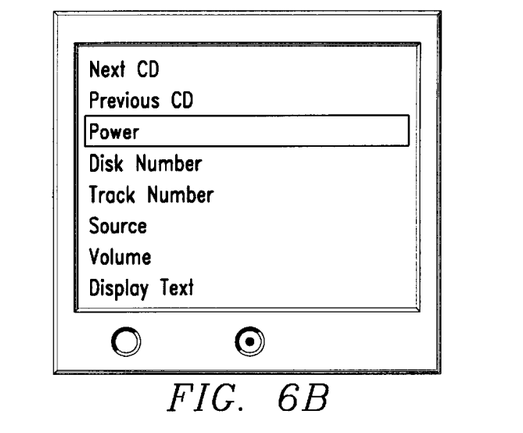
Figure 6C:
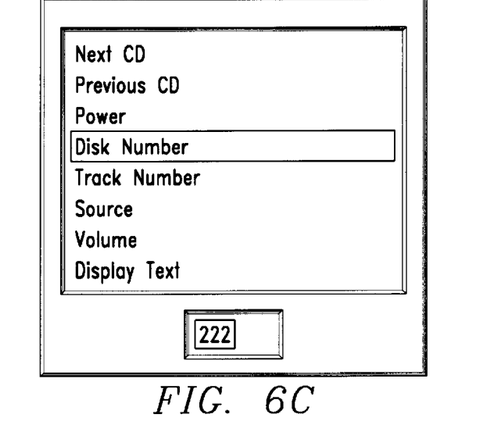
Figure 6D:
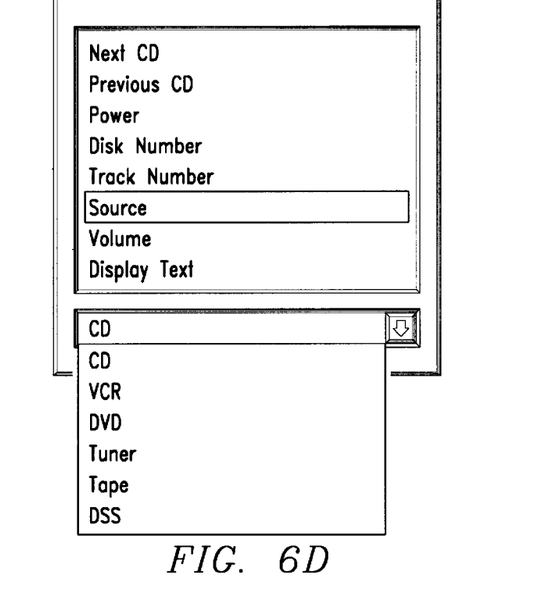
Figure 6E:
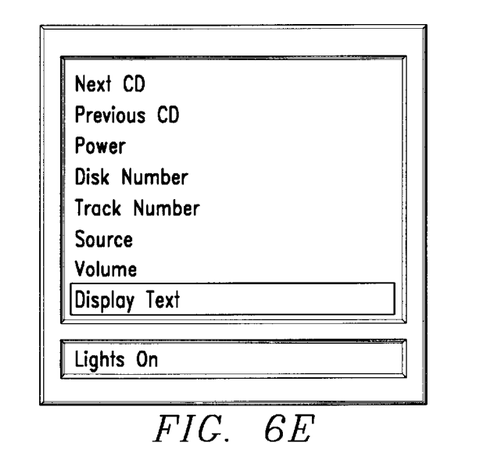
Figure 6F:
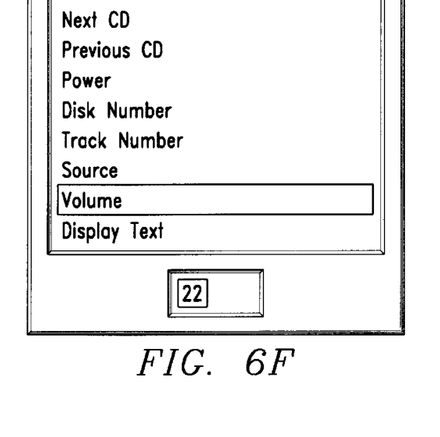

In block 134, the configuration file is displayed or otherwise indicated as an unattached software object icon on a tool bar or somewhere on the screen. Recall that the unattached new device icon is also displayed on the screen. At this point in the installation process, the user may provide some form of input to associate the unattached software object with the unattached new device, as shown in block 140. For example, this may be accomplished by dragging the unattached software object icon onto the unattached new device icon or vice versa, as shown in block 136. FIG. 5B is an exemplary screen shot 190 illustrating this concept, where object interface icons 162–174 are associated with device icons 192–198, respectively. Once this step is performed, a specific device interface object can be instantiated, as shown in block 138. Alternatively, the interface object instances may be generated when the configuration file is loaded in block 128 or upon startup when all configuration files 104 are loaded into installation software 100 prior to bringing the new device on-line. The process ends in block 142.

It may be seen that device object configuration files are what gives generic device interface object the specific details about certain devices. An example of a device object configuration file and brief description are provided below:

[Device Information]
    Manufacturer=P3 Partner
    Device Name=Test File Version 1.0
    ToolBar Location=Misc
    Hardware Name=A/V Device
    Mfg Num=18
    Device Num=17
    Toolbar Icon=ToolbarIcon.bmp
    Icon Active=ActiveIcon.bmp
    Icon Inactive=InactiveIcon.bmp
    Toolbar Location=Audio/Video
    Attachment Text=Press the ID button on the keypad four times

[Device Settings]
    Failed Response Delay=2000
    Host Info=HEX
[Commands]
    LED1 On=4,255
    LED1 Off=4, 0
    Set LED1 Level=4, % LED One Level %
    Set Config Params=4, "Setup", $0D, $0A
[Events]
    Key1 Press=10,1
    LED1 Off=4, ?, 0
    Release=10, 0
    Setup Complete=10, "Setup Completed!"
[Variable Definition]
    level LED One Level=0, {0, 255}
    state _ICON='OFF', {'ON', 'OFF'}
[Variable Get]
    ICON[ON]=5, ?, ?, 255
    ICON[OFF]=5, ?, ?, 0
    LED One Level=4, ?, % LED One Level %
    Button Pushed=10, % Button Pushed %
[Variable Put]
    LED Two Level=5, % LED One Level %
[Initialization]
    Init 1=Set Config Params It may be seen that the configuration file may be divided into sections by section headings for easy human readability. The format in which the information is presented is label=data, where the label follows a generally predetermined form and indicates what information follows the equal sign. The order in which the information is presented is not fixed. Therefore, the "Commands" section may come before "Device Information", and the "Device Num" may come before "Mfg Num", for example.

The first section, Device Information, provides data on the make and model of the device, as well as a version number of the configuration file. The "Hardware name" label is used to provide the name of the device used for the unattached hardware list. The "Mfg Num" and "Device Num" are unique identifications used to identify the maker and model of the device. The "Toolbar Icon" file, ToolbarIcon.bmp provides an icon to be used to represent the unattached hardware device on the tool bar. Additional icon bitmaps, ActiveIcon.bmp and InactiveIcon.bmp, may also be provided for additional display functionalities. The "Toolbar Location" label provides a location on the tool bar to locate the device icon. "Attachment Text" is the text that will be displayed on the screen providing a brief instruction on how to bring the device on-line.

The second section, Device Settings, provides information on communication with the device. For example, the "Failed Response Delay" provides the number of milliseconds to wait for a response if failure occurred. "Host Info" provides hexadecimal, decimal, or ASCII formats to display raw device or version information available from the device. Other device settings may provide the number of retries for a failed command and other functions.

The next section, Commands, provides a list of commands that the device may be instructed to carry out. For example, turning on or off an LED, as in the example set forth above. In the example provided above, the first number preceding the comma after the equal sign is a function number for the PHASTLink® and PHASTLink® protocol. The Commands section may also set forth the formats for command responses. FIGS. 6A–6F provides exemplary command setup windows that are displayed by installation software 102 (FIG. 3) using the command list in the configuration file. The list of commands displayed in the window is the collection of commands in the Commands section, which are located on the left side of the equal signs. The data on the right side of the equal signs are what is actually sent to the device when the corresponding command is selected. Further, the data on the right side of the equal sign further provide information on whether the command requires a state variable, text variable or level variable. It may be seen from FIGS. 6A–6F, that the command windows prompt for the setting of these variables.

The Events section describes events that occur in the device that are used to trigger something else. For example, "Key1 Press" is an event on the device that is monitored. If this happens, then the data on the right side of the equal sign is sent to master controller 36. Master controller 36 may then send commands to other devices in the system in response to being notified of this trigger event.

The next section provide for Variable Definition of variables. The variable definition takes the form: Type VarName=InitialValue,{Range},Property. The variable type may be boolean, number, level, state, or string. VarName is the text name of the variable, which is displayed in all dialog windows that refer to the variable. InitialValue is the value of the variable before any initialization occurs. The Range setting provides the range of values the variable may be set to. Property is any special property of the variable, which may be of the following:

| Property | Parameters | Description |
| --- | --- | --- |
| ASCII | None | Converts the variable from ASCII data |
| MAX | Num | Sets the maximum number of bytes to extract or compare |
| PAD | None | Pads the data with leading zeros |
| PROMPT | None | Prompts the programmer for the value in a command |
| DELIM | Char | Sets the delimiter for the end of the string or value |
| CHKSUM | Num | Checksums the data starting at byte number Num |

In the example above, the variable type is level, the variable name is "LED One Level", the initial value is zero (0), and the range is between 0 and 255, inclusive.

The Variable Get section looks for matches in the input data in the same format as command output and sets the value of the variables accordingly. The Variable Put section is used to update a device when installation software 102 sets or changes a variable. The label is the name of the variable that changed, and the data that follows after the equal sign is the command required to update the device. The Initialization section is used to initialize the device and may be omitted if the device includes firmware that implements the initialization process.

Another section, Conditionals, are associated with the state variables defined for the device. The following variable types have the corresponding conditionals:

| Variable Type | Conditionals |
| --- | --- |
| Boolean | If the variable is true or false |
| Level | If the variable is greater than, less than or equal to a specific value |
| State | If the variable is equal to: combo box of states |
| String | None |
| List | None |

Figure 7A:
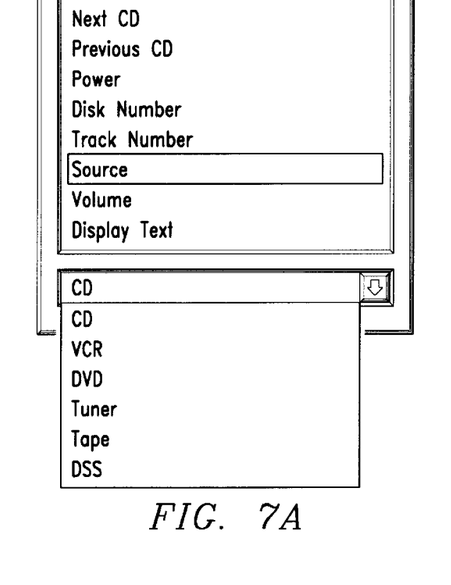
FIGS. 7A–7C are exemplary conditional variable windows for programming conditional variables according to an embodiment of the present invention.
Figure 7B:
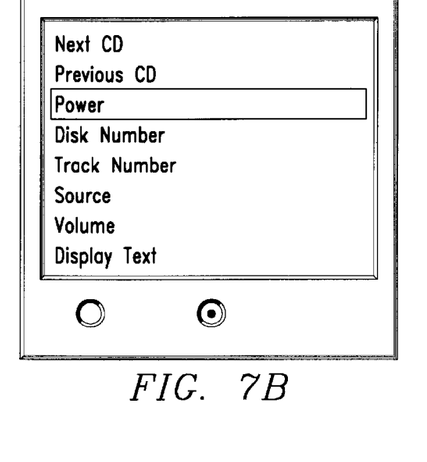
Figure 7C:
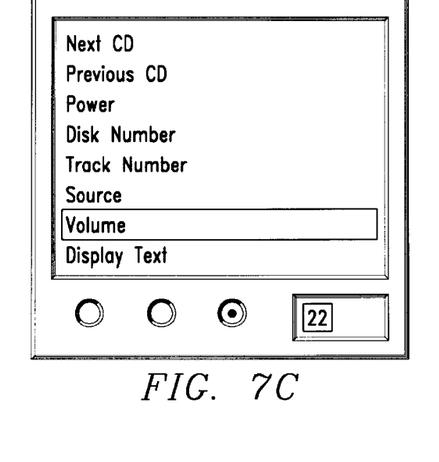

Exemplary conditional dialog windows in the installation software programming window are shown in FIGS. 7A–7C.

Included in the Appendix are an exemplary class declaration of the generic device interface object, an exemplary variable list, an exemplary command list, and an exemplary event list.

It may be seen that, with the use of configuration files, the size of device interface object and installation software is not changed. The small size of the configuration files also enable them to be embedded into memory (e.g. read only memory) in the device for quick upload to the master controller when the device is brought on-line. Further, the process by which the devices may be installed is sufficiently flexible to allow either the insertion of the hardware device first or the configuring of the device interface object first and then attach them to one another. In addition, instead of the typical six month development time required to code a device driver for a new device, it now takes a matter of one or two days to fully implement the device configuration file.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A control system, comprising:
    a master controller;
    at least one device coupled to the master controller via a network;
    at least one generic device interface module residing on the master controller, the at least one device interface module defining a basic protocol for interface with any device; and
    configuration information associated with the at least one device being operable to tailor the at least one generic device interface module to communicate and operate with the at least one device.

2. The control system, as set forth in claim 1, further comprising at least one instance of the at least one generic device interface object residing on the master controller and having the configuration information associated with the at least one device.

3. The control system, as set forth in claim 1, wherein the configuration information is described in a configuration file residing in the master controller.

4. The control system, as set forth in claim 1, wherein the configuration information is described in a configuration file residing in a data storage device accessible by the master controller.

5. The control system, as set forth in claim 1, wherein the configuration information is described in a configuration file residing in the at least one device, the configuration file being uploadable to the master controller.

6. The control system, as set forth in claim 1, where in the configuration information comprises information related to a manufacturer and model of at least one device.

7. The control system, as set forth in claim 1, wherein the configuration information comprises a unique manufacturer number representative of at least one device manufacturer and a unique device number representative of the model of at least one device.

8. The control system, as set forth in claim 1, further comprising a display coupled to the master controller, wherein the configuration information comprises data related to the display representation of the at least one device on the display.

9. The control system, as set forth in claim 1, further comprising a display coupled to the master controller, wherein the configuration information comprises a bitmap file of an icon representation of the at least one device.

10. The control system, as set forth in claim 1, wherein the configuration information comprises a definition of commands and format which the at least one device is responsive to.

11. The control system, as set forth in claim 1, wherein the configuration information comprises a definition of variables and format which the at least one device is responsive to.

12. The control system, as set forth in claim 1, wherein the configuration information comprises a definition of events and format which the at least one device is responsive to.

13. A method of communicating with a device in a control area network, comprising:
    automatically obtaining configuration information associated with the device and a configuration file including communication and operating protocol of the device;
    instantiate a specific instance of a generic device interface object using the configuration information associated with the device; and
    communication with the device via the specific object instance.

14. The method, as set forth in claim 13, further comprising:
    connecting the device to the control area network; and
    uploading the configuration information from the device via the control area network.

15. The method, as set forth in claim 13, further comprising:
    connecting the device to the control area network;
    obtaining version information associated with configuration information in the device;
    comparing the obtained version information and version information associated with configuration information available at a master controller; and
    uploading the configuration information from the device via the control area network in response to the configuration information therein having a later version.

16. The method, as set forth in claim 13, further comprising:
    displaying a software icon representative of the specific object instance;
    displaying a device icon representative of the device; and
    associating the software icon and device icon with one another.

17. The method, as set forth in claim 13, wherein automatically obtaining configuration information further comprises reading a configuration file having device information related to the device.

18. The method, as set forth in claim 17, wherein reading the configuration file comprises reading a unique manufacturer number and a unique device number associated with the device.

19. The method, as set forth in claim 17, wherein reading the configuration file comprises reading an icon bit map file associated with the device.

20. The method, as set forth in claim 17, wherein reading the configuration file comprises reading a version number associated with the configuration file.

21. The method, as set forth in claim 17, wherein reading the configuration file comprises reading display information associated with the device.

22. The method, as set forth in claim 13, wherein automatically obtaining configuration information further comprises reading a configuration file defining commands operable to be performed by the device.

23. The method, as set forth in claim 13, wherein automatically obtaining configuration information further comprises reading a configuration file defining events that may occur at the device and the corresponding data to be generated by the device and sent over the control area network in response to the occurrence of the event.

24. The method, as set forth in claim 13, wherein automatically obtaining configuration information further comprises reading a configuration file defining variables associated with operations of the device.

25. A control area network, comprising:

a master controller;

at least one device coupled to the master controller via a local area network;

at least one generic device interface object residing on the master controller, the at least one device interface object defining a basic protocol for interface with any device; and a configuration file associated with the at least one device being operable to tailor the at least one generic device interface object to generate a specific interface object instance operable to communicate and operate with the at least one device.

26. The control area network, as set forth in claim 25, wherein the configuration file resides in the master controller.

27. The control area network, as set forth in claim 25, wherein the configuration file resides in a data storage device accessible by the master controller.

28. The control area network, as set forth in claim 25, wherein the configuration file resides in the at least one device, the configuration file being uploadable to the master controller.

29. The control area network, as set forth in claim 25, wherein the configuration information comprises information related to a manufacturer and model of the at least one device.

30. The control area network, as set forth in claim 25, wherein the configuration file comprises a unique manufacturer number representative of at least one device manufacturer and a unique device number representative of a model of the at least one device.

31. The control area network, as set forth in claim 25, further comprising a display coupled to the master controller, wherein the configuration file comprises data related to the display representation of the at least one device on the display.

32. The control area network, as set forth in claim 25, further comprising a display coupled to the master controller, wherein the configuration file comprises a bitmap file of an icon representation of the at least one device.

33. The control area network, as set forth in claim 25, wherein the configuration file comprises a definition of commands and format which the at least one device is responsive to.

34. The control area network, as set forth in claim 25, wherein the configuration file comprises a definition of variables and format which the at least one device is responsive to.

35. The control area network, as set forth in claim 25, wherein the configuration file comprises a definition of events and format which the at least one device is responsive to.

* * * * *